3,078,240
PROCESS OF MANUFACTURING POLY-
URETHANE FOAM
Toshio Hoshino, 1839 Miyagaoka, Meguro-ku; Kaneyoshi Ashida, 491 Okinocho, Adachi-ku; and Teruaki Mukaiyama, 145 Ogikuoo 1-chome, Suginami-ku, all of Tokyo, Japan
No Drawing. Filed Dec. 1, 1959, Ser. No. 856,337
Claims priority, application Japan Dec. 5, 1958
1 Claim. (Cl. 260—2.5)

This invention relates to a process of manufacturing polyurethane foam and to the products made thereby, and more particularly to a process of manufacturing cellular polyurethane plastics obtained by the reaction of organic polyisocyanate, polyhydroxyl compounds and at least one novel foaming agent.

The first object of the present invention is to provide a new and useful foamed-in-place technique to make rigid polyurethane foam. The second object of the present invention is to provide a new method of making flexible polyether type polyurethane foam by using a novel foaming agent, by which the process is carried out more easily than the generally accepted methods.

Heretofore known methods of making polyurethane foam comprise reacting polyisocyanate with a compound having at least two reactive hydrogen atoms such as hydroxyl terminated linear polyester or the like in the presence of a foaming agent selected from the group consisting of (a) water, (b) carboxylic compounds including acetic acid and the like, (c) inorganic or organic salts containing water of crystallization, (d) solvents with low boiling points, (e) inorganic substance capable of evolving gas by thermal decomposition, for example ammonium carbonate, sodium bicarbonate and the like, (f) polymethylolphenol, and (g) tertiary alcohols.

In the known methods, water is very commonly used as a foaming agent; however, it has some defects. The first defect is to cause deterioration of the physical properties of the foam, because a large amount of heat is liberated in the case of the large scale foamed-in-place technique. The second defect is a tendency of the foam to collapse, and the third is difficulty of carrying out the foamed-in-place technique because of the high viscosity of the foamable liquids.

The present invention is related to a new and useful method of making polyurethane foam by the elimination of the above mentioned defects.

The novel method of making plastic polyurethane foam according to this invention is carried out without using any of the above mentioned agents. The novel foaming agents to be used in the present invention are selected from the group consisting of boric acid, aluminum hydroxide and alumina hydrogel. These hydroxyl compounds are the ones selected from the third group of the periodic table of elements, and both of the hydroxyl compounds are the same with respect to their action and effect as foaming agent in this invention. Boric acid is obtained easily in a pure state, and is a cheap solid material having some merits which will be described hereinafter. The said compounds of aluminum to be used in this invention include $AlO(OH)$ or $Al_2O_3 \cdot H_2O$, $Al_2O(OH)_4$ or $Al_2O_3 \cdot 2H_2O$, $Al(OH)_3$ or $Al_2O_3 \cdot 3H_2O$, $Al_2O_3 \cdot 4H_2O$, $Al_2O_3 \cdot 4 \cdot 4H_2O$ etc. Among these compounds, aluminum trihydroxide or alumina hydrogels in colloidal or amorphous state are most useful as the foaming agent. Preparation of the said alumina hydrogels has been described in the following literature: Gmelin's "Handbuch der Anorganichen Chemie," Bd. 35 (B), pp. 98–102; Bauer's "Handbuch der Preparativen Chemie," p. 617; Mellor's "A Comprehensive Treatise on Inorganic and Theoretical Chemistry," vol. 5, pp. 273–284.

Several examples of the preparation of the aluminum hydroxide or alumina hydrogel are as follows:

(a) According to the procedure of R. Willstätter et al. (Ber. 58, 2451 (1925)), aluminum sulfate is reacted with ammonium alum in dilute aqueous solution. Aluminum hydroxide is precipitated, decanted with distilled water several times, filtered quickly, washed with anhydrous acetone followed by anhydrous petroleum ether, and then dried in vacuum over phosphorous pentoxide.

(b) According to the procedure of H. Wilslicenus. (Z. ang. Ch. 17, 805 (1904)) 100 gr. of aluminum plate (1.0 mm. in thickness) is treated with an aqueous solution containing 1.0 gr. of mercuric chloride, and then washed with water. The resulting aluminum plate is then boiled with distilled water in a flask equipped with a reflux condenser. The voluminous precipitate obtained in a few hours is then filtered, washed with water, anhydrous acetone, and anhydrous petroleum ether, and then dried in vacuum over phosphorous pentoxide.

(c) According to the procedure of G. Brauer's book (loc. cit.), hydrargillite type aluminum hydroxide is obtained by the reaction of aluminum nitrate and ammonium carbonate.

(d) Several examples of technical manufacturing methods of the hydroxide are described in Gmelin's handbook (loc. cit.) p. 101.

(e) Colloidal alumina hydrogel is obtained from an aluminum salt and ammonia according to the procedure of Mellor's book (loc. cit.) p. 276.

The main point of the present invention lies in that polyol, polyisocyanate and the said foaming agents are reacted in the presence or absence of a suitable catalyst in at least one step to make polyurethane foam.

The said ingredients to be used in this invention are as follows:

Polyols having a molecular weight of 200 to 12,000 and containing at least two hydroxyl groups in each molecule are used. Such polyols may be polyesters, polyesteramides, polyethers and vegetable oils having hydroxyl groups.

Certain polyesters may be prepared from adipic acid, diethylene glycol and trimethylol propane; or phthalic anhydride, diethylene glycol and trimethylol propane; or a polymerized fatty acid, triethylene glycol and trimethylol propane. Some examples of polyethers are polyethylene ether glycol, polypropylene ether glycol, polybutylene ether glycol, polyalkylene arylene glycol, polyalkylene ether thioether glycol, etc. Said organic polyisocyanate includes aromatic, aliphatic, aralkyl, alicyclic and heterocyclic polyisocyanates and mixtures thereof. Typical ones include 2,4-tolylene diisocyanate, 2,6-tolylene diisocyanate, 4 - chloro - 1,3-phenylene diisocyanate, 4,4'-biphenylene diisocyanate, 1,5-naphthalene diisocyanate, 1,4-tetramethylene diisocyanate, 1,4-cyclohexylene diisocyanate, 3,3'-dimethyl-4,4'-biphenylene diisocyanate, 3,3-dimethyloxy-4,4'-biphenylene diisocyanate, triphenylmethane triisocyanate and mixtures thereof.

The catalysts suitable for use in the present invention include tertiary amines, and tertiary phosphines. Friedel-Crafts type catalysts may also be used alone or with the said bases. Representative tertiary amines include triethyl amine, tri-propyl amine, N-methyl morpholine, N-ethyl piperidine, pyridine, quinoline, N-phenyl-3,5-diethyl-2-propyl - 1,4 - dihydropyridine, phenyl - $\beta$ - piperidinoethyl-aminoethanol, N,N,N,N'-tetramethyl methylene diamine, etc. Tertiary phosphines include triethyl phosphine, tripropyl phosphine, etc.

The said Friedel-Crafts type catalysts include salts of organic acids and organometallic compounds of aluminum, zinc, iron, nickel, cobalt, tin, titanium and boron.

Examples are dibutyl tin dilaurate, cobalt naphthenate and the like.

Several examples of the foaming procedures are as follows:

According to the present invention, any one of the foaming agents mentioned above can be reacted in one step with an organic polyisocyanate and a polyol together in the presence of a catalyst as explained above, to form a cellular polyurethane. This method is commonly called the "one shot technique." Alternatively, each ingredient may be reacted in more than one step, i.e. an organic polyisocyanate is reacted first with a polyol to prepare a product, namely a quasi-prepolymer or prepolymer, and then the product is reacted with the foaming agent. The above mentioned method of making polyurethane foam is commonly called a quasi-prepolymer or prepolymer technique.

A wide variety of additives including pigments, dyestuffs, inorganic powders (silica gel, fuller's earth, metal powder etc.), foam-controlling agents (liquid paraffin, silicones, nonionic detergents) and antiflame agents, etc., may also be suitably added to the ingredients before foaming.

A foaming agent, e.g. boric acid, catalyst, surfactant and polyol are mixed completely, and the mixture is identified as foaming solution "A." Tolylene diisocyanate or its partial reaction product with polyol is identified as foaming solution "B." The solution "A" and "B" are mixed with vigorous stirring to make a white foam; addition of polyol of low molecular weight is effective to obtain light weight foam, while on the contrary it is not necessary for the preparation of rigid foam.

In the use of aluminum hydroxide or alumina hydrogel as a foaming agent to make a foam (rigid or flexible), addition of the polyol of low molecular weight as stated above is not necessary.

The use of catalysts is useful in most cases; however, it is not always necessary. The foaming reaction is observed in the absence of any catalyst and at normal or elevated temperature with minor expansion of the foam.

It is a merit of this invention that the said foaming agents act as catalysts by themselves. The reason for this is considered to be that boric acid and aluminum hydroxide each forms a kind of complex compound which acts as a catalyst.

Any of the above mentioned foaming agents can be added with any ingredient which is described above, but it is preferable that the foaming agent be added to the polyol ingredient, or the foaming agent mixed with the catalyst, detergent and other additives before mixing into the isocyanate-ingredient, in the case of the one-shot technique.

This invention has advantages over the known methods in the following points: Firstly, the liberation of heat in the foaming process is less than that in the known method using water as a foaming agent. Accordingly, when applied to making a large volume of rigid foam by using the said novel foaming agent, undesirable deterioration of the physical properties of the foam can be eliminated. The second advantage is the ease of the one shot foaming technique.

In general, the one shot technique by using water as foaming agent is very critical and frequently collapse of foam has resulted. According to the present invention, on the other hand, the foaming reaction proceeds moderately to give a desirable cellular structure without collapse of the foam, because the foaming agent of this invention, particularly hydroxyl compounds of aluminum, accelerates urethane foam formation to a higher degree. An additional advantage is that the said novel foaming agents, particularly boric acid, have a tendency to give an open cell structure, which is effective for dimensional stability.

*Example 1*

2.5 moles of adipic acid, 0.5 mole of phthalic anhydride, and 4.0 moles of glycerine are reacted to make a polyester having a hydroxyl number of 400 and an acid number of 2.0. 200 parts by weight of the polyester, 158 parts by weight of tolylene diisocyanate (isomer ratio 80/20), 2.9 parts by weight of boric acid and 10 parts by weight of nonionic detergent (HLB value 10) are mixed for 3 minutes to make a homogeneous mixture. The mixture is then quickly poured into a panel structure constructed by use of two sheets of aluminum plate 0.6 mm. in thickness, which are held 20 mm. apart. The foaming reaction proceeds for ten minutes slowly. A white rigid plastic foam having a density of 0.2 g./ml. is obtained.

*Example 2*

In the process according to Example 1, 10 parts of toluene is used as a thinner to decrease viscosity of the polyester.

The nominal density of the foam obtained is 0.13 g./ml.

*Example 3*

177 parts of polyester obtained by the procedure according to Example 1, 4.5 parts by weight of boric acid, 10 parts by weight of nonionic detergent (as in Example 1) and 10 parts by weight of toluene are mixed. The mixture is identified as "solution $A_1$." 130 parts by weight of tolylene diisocyanate (isomer ratio 65/35) and 23 parts of the said polyester are mixed to make a solution. The mixture is identified as "solution B." Solutions A and B are stored.

100 parts of "solution $A_1$" and 76.5 parts of "solution B" are mixed vigorously, with different amounts of dimethylaminomethyl acetone used as catalyst, to form a rigid foam having the densities shown in the following table:

| Catalyst, parts by weight | Density of Foam, (g./ml.) |
|---|---|
| 0 | 0.084 |
| 5 | 0.075 |
| 10 | 0.071 |
| 20 | 0.060 |

*Example 4*

Solutions $A_2$, $A_3$ and $A_4$ are prepared as shown in the following table:

| Solution | $A_2$ | $A_3$ | $A_4$ |
|---|---|---|---|
| Polyester (g.) | 177 | 177 | 177 |
| Nonionic detergent (g.) | 10 | 10 | 10 |
| Boric acid (g.) | 4.5 | 3.0 | 1.5 |

40 g. of solutions $A_2$, $A_3$ and $A_4$ and 31 g. of solution B are mixed vigorously with 8 drops of dimethylaminomethyl acetone in a paper cup.

Density of the foams obtained are as follows:

| | $A_2$ | $A_3$ | $A_4$ |
|---|---|---|---|
| Density (g./ml.) | 0.053 | 0.084 | 0.096 |

*Example 5*

Flexible foam is obtained by the following procedure:

Dimer acid type polyester is prepared by reacting 608 parts by weight of dimer acid, 127 parts by weight of diethylene glycol and 40 parts by weight of trimethylol propane. 1500 g. of the polyester thus obtained, 400 ml. of hexylene glycol, 260 g. of boric acid and 50 ml. of triethylamine are mixed and rolled to make solution "$A_5$."

On the other hand, 500 g. of the polyester and 810 ml. of tolylene diisocyanate are mixed to form a solution "B." 100 g. of solution "$A_5$" and 65 g. of solution "B" are mixed with vigorous stirring until the foaming reaction takes place. A white flexible foam having a density of 0.03 g./ml. is obtained.

Example 6

Polyester is prepared by use of adipic acid, phthalic anhydride and glycerine according to Example 1.

20 g. of the polyester having a hydroxyl number of 400, 17 g. of tolylene diisocyanate (isomer ratio 80/20), 3.6 parts of aluminum hydroxide [chemically pure reagent grade] and 0.5 part of nonionic detergent having a hydrophilic-lypophilic balance value of 10 are mixed and allowed to stand. The foaming reaction takes place in a few minutes and after 4 to 5 minutes the volume of the mixture expands up to 17 times the volume of the original liquid. The foam thus obtained is a white, rigid foam having a fine cell structure.

Example 7

The ingredients used were the same as in Example 6, except for the additional use of 0.5 ml. of triethylamine. The foaming reaction is rapid, and an expanded mass having 21 times the original volume of the mix is obtained in a period of 20 to 40 seconds.

Example 8

20 g. of the polyester obtained by the same procedure as in Example 5, 2.3 g. of aluminum hydroxide as described in Example 6, and 0.5 g. of dimethyl ethanolamine are mixed vigorously to make a foam having 20 times the volume of the original liquid.

Example 9

20 g. of polypropylene glycol having a molecular weight of 2000, 20 g. of N,N,N',N' tetra(polyethylenepropylene)ethylenediamine having a molecular weight of 4000, 4.28 g. of aluminum hydroxide, 2.5 ml. of nonionic detergent having a hydrophilic-lypophilic balance value of 10, 13.7 ml. of tolylene diisocyanate (isomer ratio 80/20), 1.5 ml. of dibutyl tin dilaurate, and 0.5 ml. of N-methyl morpholine are mixed in one step. The foaming reaction takes place rapidly and a white flexible foam having a nominal density of 0.034 g./ml. is obtained.

Example 10

1800 parts by weight of castor oil, 1300 parts by weight of tolylene diisocyanate (isomer ratio 80/20) and 30 parts by weight of powdered silica gel are mixed and heated at a temperature of from 130 to 140° C. 20 g. of the modified castor oil and 3.0 g. of aluminum hydroxide are mixed completely, and then 0.5 g. of triethylamine is added to the mixture and followed by vigorous stirring. The foam obtained is white, flexible and has a volume 11 times that of the original liquid.

Example 11

25.5 g. of prepolymer obtained by reacting 200 parts of polyether and 55 g. of tolylene diisocyanate (isomer ratio 80/20), said polyether being a mixture of 3 parts by weight of polypropylene glycol and 1 part by weight of N,N,N',N' tetra (polyethylenepolypropylene)ethylenediamine, having a molecular weight of 3000, 1.8 g. of aluminum hydroxide, ignition loss of 57%, and 0.7 g. of triethylamine are mixed with vigorous stirring. 320 ml. of a white flexible foam having a density of 0.08 is obtained.

Example 12

50 parts by weight of a polyether for producing rigid foam is mixed with 343 parts by weight of tolylene diisocyanate (isomer ratio 80/20) and heated to 70° C. 50 parts by weight of the same polyether is added to the mixture at the same temperature, and then the mixture is heated to 90°, and kept for 30 minutes at the same temperature. The reaction product is then cooled to normal temperature.

33 g. of the quasi-prepolymer thus obtained, 17.5 g. of the same polyether, 0.4 ml. of silicone oil having a viscosity of 50 centistokes, 2.9 g. of aluminum hydroxide and 0.4 ml. of N-methyl morpholine are mixed with vigorous stirring to make a white rigid foam. The foaming reaction is continued for 8 minutes to make 800 ml. of rigid foam, which is then heated at 100° C. for 30 minutes. In this step, the second foaming reaction is observed and the foam is expanded to 1000 ml. The density of the foam thus obtained is 0.043.

Example 13

25 g. of a polyether for producing rigid foam, 33 g. of the quasi-prepolymer prepared according to Example 12, 0.3 ml. of silicone oil having a viscosity of 50 centistokes, 3.4 g. of boric acid and 1.0 ml. of N-methyl morpholine are mixed with vigorous stirring. A white, rigid foam is obtained, of which the density is 0.039 g./ml.

Example 14

The procedure and ingredients are the same as in Example 12, except that a mixture of 1.5 g. of aluminum hydroxide and 1.1 g. of boric acid is used instead of 1.9 g. of aluminum hydroxide as a foaming agent. A white, rigid foam having the volume of 700 ml. is obtained.

What we claim is:

A process of manufacturing polyurethane foam, which comprises reacting a polyol and an organic polyisocyanate in a reaction mixture containing a catalyst and a foaming agent, said polyol having a molecular weight of from 200 to 12,000 and containing at least two hydroxyl groups in each molecule and being selected from the group consisting of polyesters, and polyethers, and said foaming agent being boric acid.

References Cited in the file of this patent

UNITED STATES PATENTS 2,865,869    Hindersinn et al. _____ Dec. 23, 1958